US010295216B2

(12) United States Patent
Yuan

(10) Patent No.: US 10,295,216 B2
(45) Date of Patent: May 21, 2019

(54) MODULAR ASSEMBLY FOR REGULATING MOISTURE AND TEMPERATURE OF CONTENT IN A CONTAINER

(71) Applicant: Defang Yuan, Ottawa (CA)

(72) Inventor: Defang Yuan, Ottawa (CA)

( * ) Notice: Subject to any disclaimer, the term of this patent is extended or adjusted under 35 U.S.C. 154(b) by 322 days.

(21) Appl. No.: 15/078,177

(22) Filed: Mar. 23, 2016

(65) Prior Publication Data

US 2017/0276384 A1 Sep. 28, 2017

(51) Int. Cl.

| | |
|---|---|
| ***F24F 6/00*** | (2006.01) |
| ***F24F 11/77*** | (2018.01) |
| ***F24F 1/022*** | (2019.01) |
| ***F24F 11/30*** | (2018.01) |
| ***F24F 11/83*** | (2018.01) |
| *F24F 110/20* | (2018.01) |
| *F24F 11/61* | (2018.01) |
| *F24F 110/10* | (2018.01) |
| *F24F 3/14* | (2006.01) |
| *F26B 21/08* | (2006.01) |
| *B65F 1/14* | (2006.01) |

(52) U.S. Cl.

CPC ................ *F24F 11/77* (2018.01); *B65F 1/14* (2013.01); *F24F 1/022* (2013.01); *F24F 11/30* (2018.01); *F24F 11/83* (2018.01); *B65F 1/1426* (2013.01); *B65F 2210/116* (2013.01); *B65F 2210/13* (2013.01); *B65F 2210/181* (2013.01); *B65F 2210/20* (2013.01); *F24F 3/1405* (2013.01); *F24F 11/61* (2018.01); *F24F 2003/1446* (2013.01); *F24F 2110/10* (2018.01); *F24F 2110/20* (2018.01); *F26B 21/086* (2013.01)

(58) Field of Classification Search

CPC ............. F24F 3/1405; F24F 2003/1446; B65F 2210/20; B65F 2210/116; B65F 1/1426; F26B 21/086

USPC .......................................................... 165/223

See application file for complete search history.

(56) References Cited

U.S. PATENT DOCUMENTS 6,233,841 B1 5/2001 Beach
6,481,232 B2 * 11/2002 Faqih .................... F24F 13/222 62/285

(Continued)

FOREIGN PATENT DOCUMENTS

CN 2520466 Y 11/2002
CN 101881493 11/2010

(Continued)

OTHER PUBLICATIONS

Translation of German Patent Document DE 29617499 U1 entitled Translation—DE 29617499 U1.*

(Continued)

*Primary Examiner* — Paul Alvare
(74) *Attorney, Agent, or Firm* — Aventum IP Law LLP

(57) ABSTRACT

A modular assembly for regulating moisture and temperature of content of a container, and method associated thereof. The system includes a moisture and temperature regulating device with a condenser and an evaporator separated by a heat insulation layer; a container with moist content, the container and the moisture and temperature regulating device are joinable, and moisture and temperature associated with the container are regulated by the moisture and temperature regulating device.

7 Claims, 6 Drawing Sheets

(56) References Cited

U.S. PATENT DOCUMENTS

| | | | | |
|---|---|---|---|---|
| 6,755,036 | B1 * | 6/2004 | Sastry | F24F 1/025 62/176.5 |
| 8,800,307 | B2 | 8/2014 | Thogersen et al. | |
| 2009/0145150 | A1 * | 6/2009 | Konrad | F25D 15/00 62/255 |
| 2010/0154248 | A1 | 6/2010 | Stolze | |
| 2011/0041539 | A1 | 2/2011 | Nylykke | |
| 2011/0247352 | A1 | 10/2011 | Zanolin et al. | |
| 2013/0014522 | A1 * | 1/2013 | Lukasse | F25D 17/042 62/93 |
| 2014/0318166 | A1 | 10/2014 | Loebach | |

FOREIGN PATENT DOCUMENTS

| | | | | |
|---|---|---|---|---|
| CN | 202209858 | | 5/2012 | |
| DE | 29617499 | U1 * | 12/1996 | B65F 1/14 |
| WO | WO-2014070292 | A1 | 5/2014 | |

OTHER PUBLICATIONS

Osaw Industrial Products PVT. Ltd., "Indosaw: Germination Equipments," http://www.indosawagri.com/germination_equipments.html; accessed on Aug. 15, 2013; 12 pages.

* cited by examiner

MODULAR ASSEMBLY FOR REGULATING MOISTURE AND TEMPERATURE OF CONTENT IN A CONTAINER

FIELD OF THE INVENTION

The present invention relates to controlling the moisture and temperature of the content of a container. More specifically, it is directed to a modular assembly that comprises a moisture and temperature regulating device, and a container, where the moisture and temperature regulating device and the container are separate but joinable by coupling means. When the moisture and temperature regulating device and the container are joined, moisture and temperature associated with the container are regulated by the moisture and temperature regulating device.

BACKGROUND OF THE INVENTION

As the world population increases, the amount of household trash produced each year also increases. Studies estimate that in 2013, each person produced more than 4 pounds of waste each day. Municipalities have attempted to come up with various strategies to efficiently deal with waste disposal.

Across the municipalities in North America, household garbage is collected, typically only on a weekly basis, by curbside pickup of organics compostable contained in paper bags. As a result, household garbage accumulates over the week waiting to be collected. As a result, kitchen garbage, which contains, in large part, organics compostable, starts to decay. In warm and hot weather, waste decay typically accelerates, and garbage odors become an issue.

Garbage odor can cause the entire house to smell unpleasant. To control garbage odors, various methods have been used, for example, by sealing the garbage container to prevent odor from flowing outside, using baking soda, cat litter or other chemicals to prevent odors, using drying sheets to absorb the moisture in garbage containers and prevent odors, putting garbage in colder places to suppress odors, etc.

There remains a need however, to effectively regulate moisture and temperature of contents in garbage containers.

It is well known that bacteria, fungi, and other microorganisms break down the organic material inside the garbage. Microorganisms that live in temperatures from 10° C.-45° C. begin the decomposition process. The microorganisms generate heat as they consume and digest the content in the garbage container. As the garbage content heats up, other microorganisms that live in temperatures from 45°-70° C. take over the decomposition process.

The bacteria that decompose the garbage content require moisture and oxygen. If the garbage content is low in humidity, or if bacteria use up the available oxygen, the temperature drops and the decomposition process slows down.

Therefore, by regulating the moisture and temperature of the content in garbage containers, households can effectively control waste decay and in turn garbage odor.

United States Patent Application (Pub US20110041539) discloses a method for dehumidifying a refrigerated transporting container. The refrigeration system comprises a refrigeration circuit including an evaporator, a compressor, an expansion valve and a condenser. The refrigeration system also comprises a control unit and a cooling space, the evaporator is placed in the cooling space and air blows over the evaporator to be cooled down.

United States Patent Application (Pub US20140318166) discloses a moisture removal system comprising a plurality of coils each capable of operation as either a condenser or evaporator, and a switching mechanism to cycle the functionality of the coils. The system may cycle the functionality of the coils to alleviate frost development on any one coil and thus speed a moisture removal process.

Chinese utility model CN202209858U discloses a drying box comprising a box body with a heat insulating layer on the circumferential wall, wherein an overhead stacking area is arranged in the box body, a refrigerating system is installed on the sidewall of the box body and comprises a compressor, an evaporator and a condenser, the evaporator and the condenser are structurally integrated, a filter/net is arranged between the evaporator and the condenser, the output end of the compressor is connected with the input pipe of the condenser, the output pipe of the condenser is connected with a drying filter through a liquid storage cylinder, one path of the output end of the drying filter is connected with the input pipe of the evaporator through an expansion valve while the other path of the output end of the drying filter is connected with the input end of the compressor through an unloading valve, the output pipe of the evaporator is connected with the input end of the compressor, and the box body is communicated with the evaporator through an exhaust pipe and communicated with the condenser through an intake pipe.

International Patent Application (Pub WO2014070292A1) discloses a method for accelerating the drying of a cargo box of a refrigerated truck, trailer, or container following a wash out, the method includes circulating air from the cargo box through an evaporator of the refrigerant unit and back to the cargo box and operating the refrigerant unit in alternating cycles of first heating the circulating air and then cooling the circulating air.

United States Patent Application (Pub US20110247352) discloses a wall-hanging dehumidifier includes a shell in the form of a cabinet, air inlets and air outlets on the shell, and a fan system and a refrigeration system in the shell.

Chinese patent application CN101881493A discloses a wall-mounted dehumidifier where the opening directions of an air inlet and an air outlet are opposite to each other; the air entering the dehumidifier flows through the surface of the condenser; the condensed air follows through the surface of the heat radiator; the fan is arranged on one side of the air inlet of the heat radiator, so that the whole dehumidifier is thin.

None of the above prior art references provides a solution for a modular, easy-assembled system to regulate the moisture and temperature of the content of a container as disclosed herein.

The modular system disclosed herein comprises a moisture and temperature regulating device and a separate portable container, where the moisture and temperature regulating device and the container are joinable by coupling means. Within the moisture and temperature regulating device, the condenser section and the evaporator section is separated by a heat insulation layer. When the moisture and temperature regulating device and the container are joined, the moisture and temperature regulating device is used to control the moisture and temperature of the content of the container.

SUMMARY OF THE INVENTION

An objective of the present invention is to solve garbage decay and odor problems on warm or hot days.

Another objective is to thaw garbage container contents frozen on cold days, for example, at below minus 2° C. temperature, to facilitate weekly garbage collection and removal.

The present invention addresses the problem of household garbage decay and garbage odor caused by moisture and warm temperature by providing an assembly that comprises a moisture and temperature regulating device and a separate portable garbage container, where the moisture and temperature regulating device and the garbage container are joinable by coupling means. When the moisture and temperature regulating device and the garbage container are joined, the moisture and temperature regulating device is used to control the moisture and temperature of the content of the garbage container.

The assembly is modular and easy to assemble.

In a preferred embodiment, the moisture and temperature regulating device is wall mountable. The moisture and temperature regulating device can provide removing moisture, cooling, heating functions.

A separate portable garbage container is rollable on the floor and joinable by coupling means with the moisture and temperature regulating device. The garbage container is separate but joinable to the moisture and temperature regulating device for easy handling.

In accordance with one aspect of the present invention, there is provided a modular assembly for regulating moisture and temperature of content of a container comprising:

- a moisture and temperature regulating device comprising:
  - a housing equipped with an outside environment temperature sensor and wherein a cover plate of the housing has an air inlet and an air outlet;
  - a condenser section equipped with a condenser, a condenser fan, and a compressor;
  - an evaporator section equipped with a ventilation fan, an evaporator, an inside environment temperature sensor, an inside humidity sensor, a heater, and water drainage pipe;
  - wherein the condenser section and the evaporator section is separated by a heat insulation layer;
- a portable container separate and joinable to the moisture and temperature regulating device, the container having a coupling plate with an upper ventilation outlet and a lower ventilation inlet contained therein,
- the air inlet of the moisture and temperature regulating device is joinable with the upper ventilation of the container by coupling means;
- the air outlet of the moisture and temperature regulating device is joinable with the lower ventilation of the container by coupling means;
- when the moisture and temperature regulating device and the container are joined, moisture and temperature associated with the content of the container are regulated by the moisture and temperature regulating device.

In accordance with another aspect of the invention, there is provided a moisture and temperature regulating device comprising:

- a housing equipped with an outside environment temperature sensor and wherein a cover plate of the housing has an air inlet and an air outlet;
- a condenser section equipped with a condenser, a condenser fan, and a compressor;
- an evaporator section equipped with a ventilation fan, an evaporator, an inside environment temperature sensor, an inside humidity sensor, a heater, and water drainage pipe; wherein the condenser section and the evaporator section are separated by a heat insulation layer.

Other features and advantages of the present invention will become apparent from the following detailed description and the accompanying drawings, which illustrate, by way of example, the principles of the invention.

BRIEF DESCRIPTION OF THE DRAWINGS

The invention will now be described by way of reference to the drawings, in which.

Figure 5:
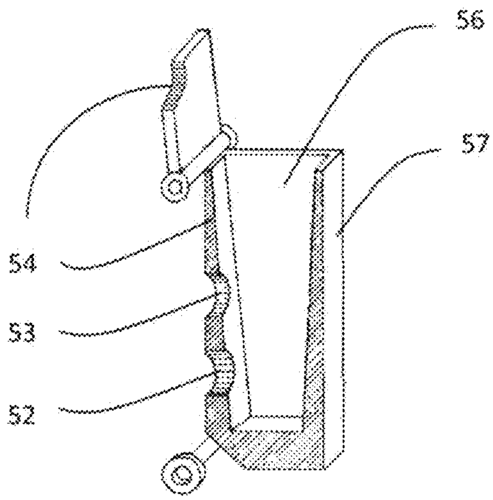
Figure 6:
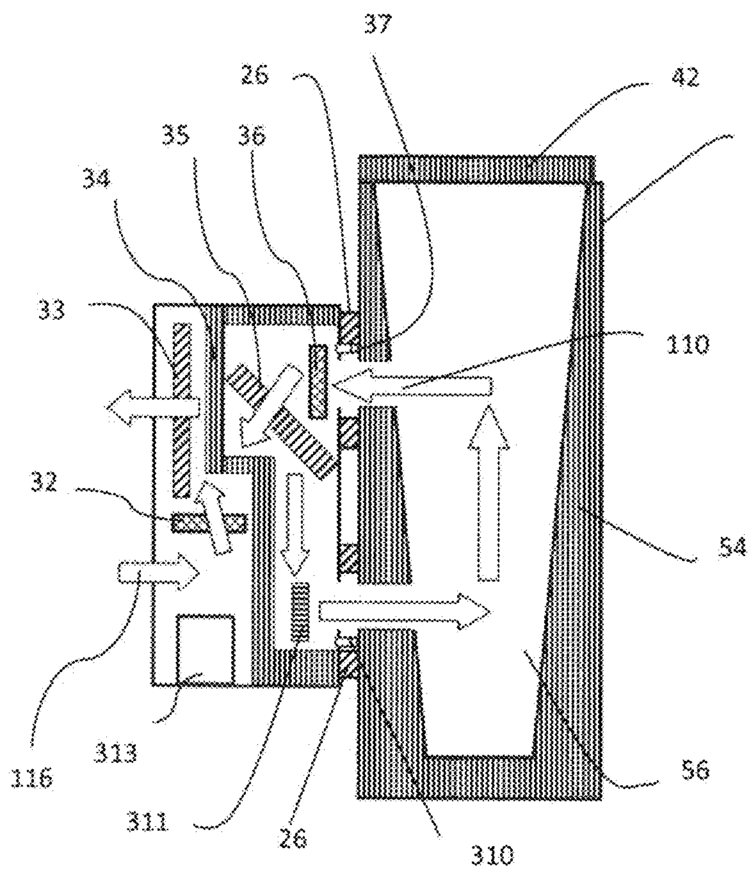
Figure 7:
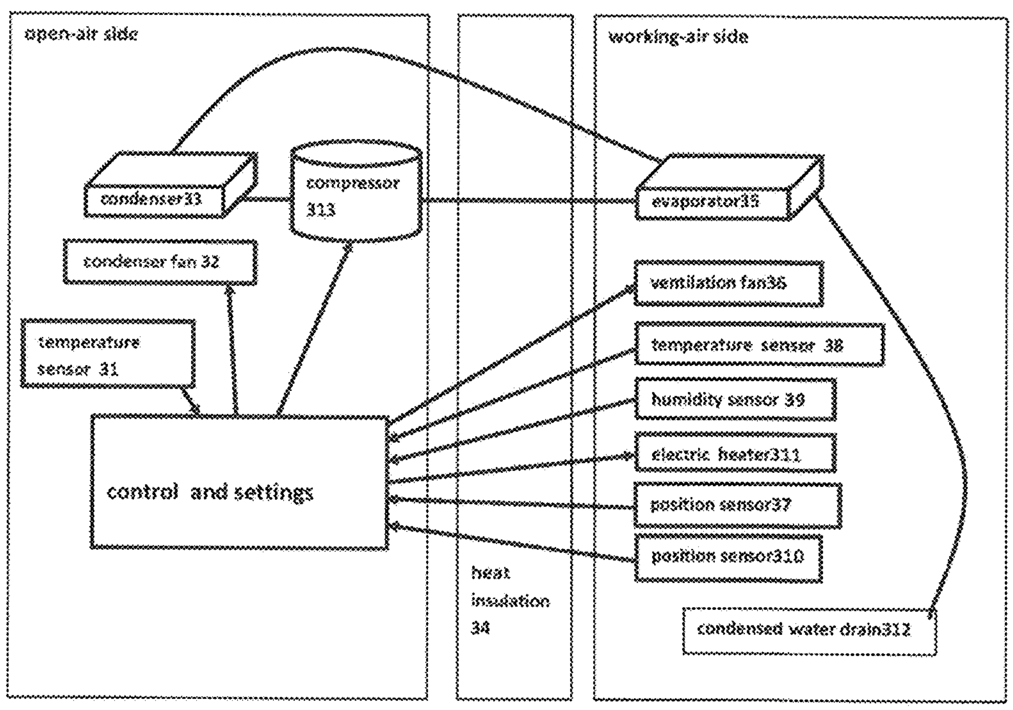
Figure 8:
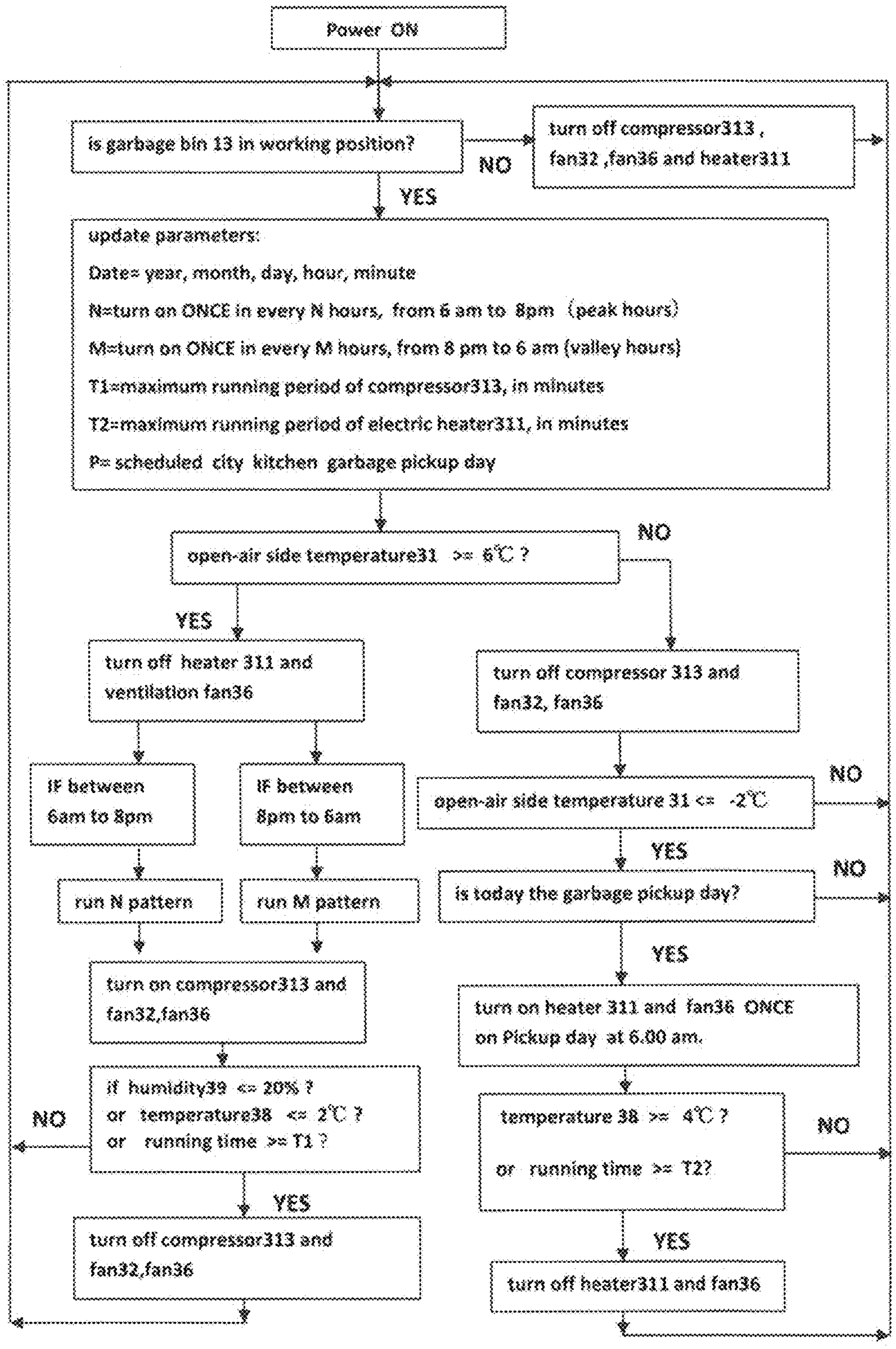

FIG. **4*a*** is a schematic perspective view of a rolling portable container of the present invention;

FIG. **4*b*** is a schematic perspective view a rolling portable container with upper ventilation outlet and lower ventilation inlet of the present invention;

FIG. 5 is a cross-section view of a rolling portable container of the present invention;

FIG. 6 is a cross-section view of the modular assembly joined by moisture and temperature regulating device and a rolling portable container where the assembly is in operation;

FIG. 7 is a flowchart according to an embodiment of the assembly in operation;

FIG. 8 is a flowchart according to an embodiment of the assembly in operation.

DETAILED DESCRIPTION OF THE INVENTION

Figure 1:
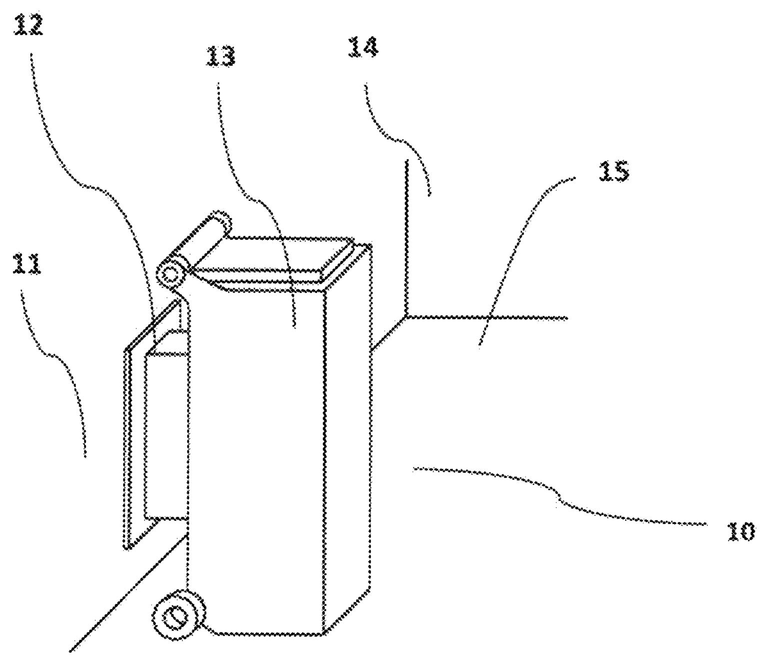
FIG. 1 is a schematic perspective view of an embodiment of a wall mountable moisture and temperature regulating device and a container of the present invention.

Referring to FIG. 1, an example embodiment of a modular assembly 10 described herein comprises a moisture and temperature regulating unit 12, and a separate portable rolling container 13.

In a preferred embodiment, container 13 is a garbage container for household use, although a person skilled in the art would understand that container 13 is not limited as a garbage container, rather, it may be a container with content contained therein which requires moisture and temperature regulation.

Moisture and temperature regulating unit 12 may be wall mountable to a vertical surface, for example, a wall 11 (as shown) or 14 (not shown), by mounting means known in the prior art. The phrase "wall mountable" means that it is able to be mounted or attached to any vertical surface.

Container 13 is portable and rollable on floor 15. Moisture and temperature regulating unit 12 and container 13 are modular components of system 10; they are separate and can be coupled together or assembled quickly by coupling means as described hereinafter.

Figure 2:
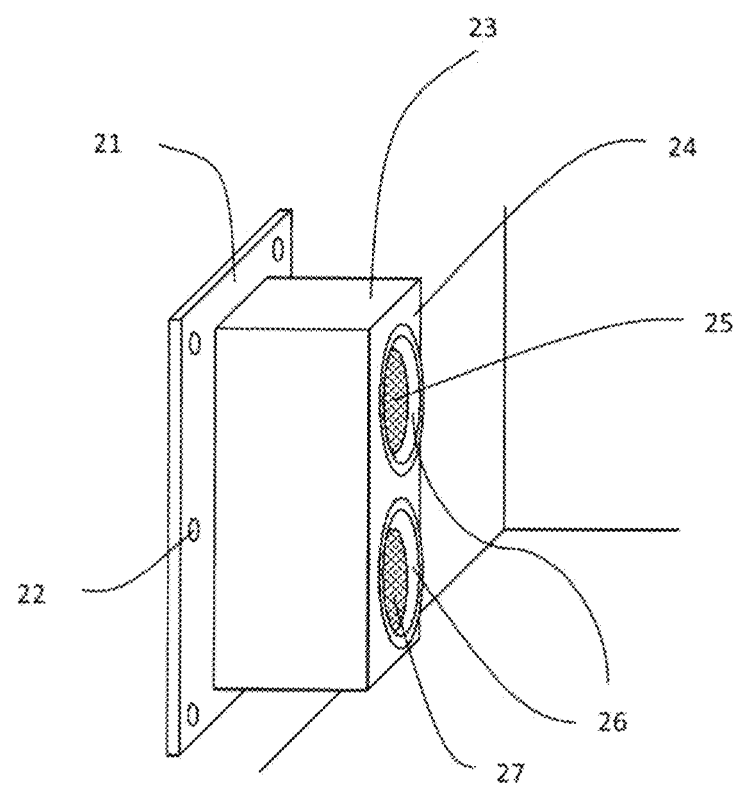
FIG. 2 is a schematic perspective view of an embodiment of a wall mountable moisture and temperature regulating device with air inlet and outlet of the present invention.

Referring to FIG. 2, an example embodiment of the moisture and temperature regulating unit 12 described herein comprises, or is mountable or associated to, a mounting base 21. Mounting base 21 is further mountable to a vertical surface or a wall, by nails, screws or the like by mounting means through mounting apertures 22.

Moisture and temperature regulating unit 12 has a housing body or an outer case 23, the unit further comprises a cover plate 24 parallel to and facing away from mounting base 21. Cover plate 24 has an upper air inlet 25 and a lower air outlet 27, wherein the upper air inlet 25 is positioned above the lower air outlet 27.

In a preferred embodiment of the present invention, sealing cushion 26 is provided around the mount protrusion of the air inlet 25 and/or the outlet 27. Sealing cushion 26 may be in the shape of a circle, oval, elliptical, or a polygonal. Sealing cushion 26 may be composed of soft materials, selected to match the conditions under which the seal is to be used, for example, plastic, polytetrafluoroethylene, and/or other suitable materials.

In a preferred embodiment of the present invention, air inlet 25 and/or outlet 27 are further protected with a screen structure (not shown) to prevent sizable solid particles, and/or insects, from passing through the screen structure.

Figure 3:
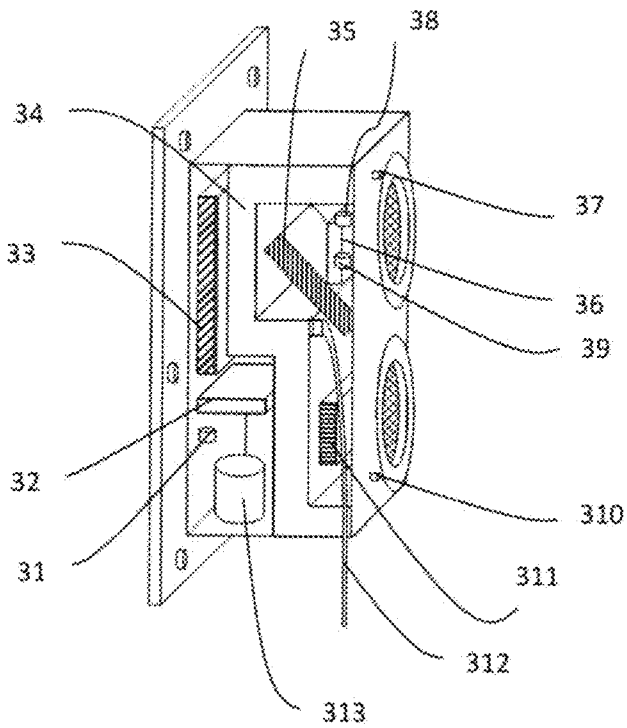
FIG. 3 is a section view of the inside components of an embodiment of a wall mountable moisture and temperature regulating device with air inlet and outlet of the present invention.

Referring to FIGS. 2 and 3, an example embodiment of the moisture and temperature regulating unit 12 comprises, within its housing body, a condenser fan 32, a condenser 33, a compressor 313, a heat insulation layer 34, an evaporator 35, a ventilation fan 36, an inside environment temperature sensor 38, an inside humidity sensor 39, a heater 311, a water drainage pipe 312.

On the outside of cover plate 24, first position sensor 37 and second position sensor 310 are positioned in the vicinity of the air inlet 25 and/or the air outlet 27, respectively, and first position sensor 37 is positioned beside the upper part of sealing cushion 26 and second position sensor 310 is positioned beside the lower part of sealing cushion 26. In the condenser side there is an outside environment temperature sensor 31, it senses air flows between the outside environment and the condenser side, sensor 31 can measure the temperature of the outside environment.

Dehumidifiers are known. In a standard dehumidifier, a fan draws in humid air and carries it through a refrigerated evaporator. The air is cooled below its dew point. The moisture from the humid air condenses on the cold surface of the evaporator and drips into a water container or is led directly to a drain. Then the cold dry air continues through a hot condenser which heats it up and returns it to the room to pick up new humidity. This procedure is continued until the desired condition is achieved. In this type of dehumidifiers, evaporator and condenser are in the same space where cooling of moist air condensation, heat exchange between moist air and condenser occurs.

In contrast to the standard dehumidifier, in accordance with the present invention, in moisture and temperature regulating unit 12, the cooling are separated by a heat insulation layer 34 so that there is no heat exchange between moist air and the condenser, as described below.

Figures 4A, 4B:
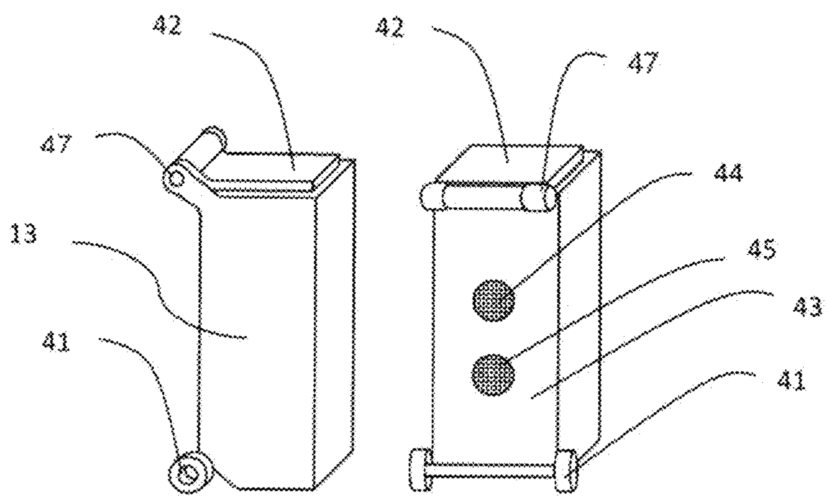

Referring to FIGS. 4*a* and 4*b*, portable container 13 is equipped at its bottom with wheels 41, enabling the container to roll on a floor.

In a preferred embodiment, portable container 13 is further equipped with a cover 42. Cover 42 is rotatable along the cover pivot axis 47. Shown in FIGS. 4*a* and 4*b*, the cover 42 is held in a closed position.

One side of the housing body of the garbage container, preferably vertically up along the cover pivot axis, is coupling plate 43. The coupling plate 43 has an upper ventilation outlet 44 and a lower ventilation inlet 45, wherein the ventilation outlet 44 is positioned above the ventilation inlet 45. Air inlet 25 of moisture and temperature regulating unit 12 and upper ventilation outlet 44 of the container are at the same height and of the same or similar size; they are joinable by coupling means. Air outlet 27 of moisture and temperature regulating unit 12 and lower ventilation inlet 45 of container 13 are at the same height and of the same or similar size; they are joinable by coupling means.

Referring to FIG. 5, garbage container 13 has two openings, namely, lower ventilation inlet aperture 52 and upper ventilation outlet aperture 53. These apertures correspond in height and size to air outlet 27 and air inlet 25 of the moisture and temperature regulating unit 12, respectively, where lower ventilation inlet aperture 52 corresponds to the cross-section view of lower ventilation inlet 45 in FIG. 4*b* and upper ventilation outlet aperture 53 corresponds to the cross-section view of upper ventilation outlet 44 in FIG. 4*b*.

Cover plate 24 and coupling plate 43 are either both flat or of complimentary shapes such that when the moisture and temperature regulating unit 12 and the container 13 are joined together by coupling means, a sealed assembly 10 is formed, and said assembly is separate from the external or outside environment whereas evaporator 35 of the moisture and temperature regulating unit 12 and content of the container 13 are within the same inside air circulation space.

Use of sealing cushion 26 further ensures air tightness of assembly 10 from the external environment, while ensuring best circulation within inside air circulation space.

In a preferred embodiment of the present invention, garbage container 13 is constructed of a two-layer structure filled with heat insulated material or air gap 54, thus the content of the garbage container is heat-insulated from open air. Alternatively, heat insulation can be achieved by using heat insulated material to construct the housing body of the container.

In a preferred embodiment of the present invention, cover 42 of container 13 is constructed of a two-layer structure filled with heat insulated material or air gap, thus the content of the container is heat-insulated from open air. Alternatively, heat insulation can be achieved by using heat insulated material to construct cover 42 of container 13.

In a preferred embodiment of the present invention, container 13 has an outer case 57 and an inner space 56. Container inner space 56 may have a smaller bottom surface and larger top surface with a recess angle of about one to three degrees to facilitate pouring of the content of garbage container.

In a preferred embodiment of the present invention, container 13 is equipped with a handle for easy handling.

On the outside of cover plate 24 of the moisture and temperature regulating device 12, first position sensor 37 and second position sensor 310 are positioned for detecting that container 13 is in the normal operating position, where first position sensor 37 is positioned beside the upper part of sealing cushion 26 and second position sensor. 310 is positioned beside the lower part of sealing cushion 26.

When separated from the moisture and temperature regulating device 12, container 13 functions as a regular container.

In a preferred embodiment, container 13 is a garbage container for household use.

When joined with the moisture and temperature regulating device 12, container 13 and the moisture and temperature regulating device 12 form a closed air circulation system, where first position sensor 37 and second position sensor 310 are activated, and closed circulation airflow path 110 is formed. Air within this closed system flows through air inlet 25 of the moisture and temperature regulating unit 12 which is now coupled with upper ventilation outlet 44 of the container, and air outlet 27 of moisture and temperature regulating unit 12 which is now coupled with lower ventilation inlet 45 of container 13, thus regulating the moisture and temperature of the content of garbage container 13. Sealing cushion 26 ensures air tightness of the closed airflow path from the external environment. First position sensor 37 and second position sensor 310 are both activated when coupling plate of the container and cover plate of the moisture and temperature regulating device abut and make face-to-face contact, where sealing cushion 26 is also compressed and air tightness condition is secured.

Condenser 33 and evaporator 35 in the moisture and temperature regulating device 12 are thermally isolated in two different spaces by heat insulation layer 34; and there is no direct heat exchange in between the two spaces. When modular assembly 10 operates as described below, the air in the evaporator-side section and the air in the condenser-side section are separated from each other and no convection occurs.

When external or outside environment temperature is higher than 6° C., assembly 10 operates as described below, where moisture and temperature regulating device 12 regulates the moisture and temperature of the content of container 13.

In a preferred embodiment, container 13 is a garbage container for household use, moisture and temperature regulating device 12 regulates the moisture and temperature of the content of container 13 preventing garbage decay and garbage odor.

Referring to FIGS. 6, 7 and 8, when power of the moisture and temperature regulating device 12 is turned on, first position sensor 37 and second position sensor 310 detect whether the container 13 is in normal operating position, i.e., (1) moisture and temperature regulating unit 12 and (2) container 13 with content contained therein which requires moisture and temperature regulation, are joined together by coupling means.

When moisture and temperature regulating unit 12 and container 13 are joined together by coupling means, sensors 37 and 310 are activated. Sealed assembly 10, which is separate from the external environment, is formed. Evaporator 35 of moisture and temperature regulating unit 12 and content of container 13 are within the same inside air circulation space. A processor installed on the moisture and temperature regulating unit 12 then updates the unit parameters. Unit parameters may be pre-programmable, include but are not limited to, time and date, frequency at which the unit will be turned on (for example, once in every N or M hours depending on whether it is electricity peak or off-peak hours, referred hereinafter as the N or M pattern), maximum running time T1 for compressor 313, maximum running time T2 for heater 311, scheduled city garbage pickup date, etc.

When external or outside environment temperature sensor 31 detects that external environment temperature is at or above 6° C., heater 311 and ventilation fan 36 are turned off. Depending on whether the time is between the hours (for example, 6 am to 8 pm) preset under N pattern or M pattern (for example, 8 pm to 6 am), the assembly is run under N or M pattern, where compressor 313, condenser fan 32, and ventilation fan 36 are turned on.

Airflow path 110 within the evaporator-side section and the space of container 13 is shown in FIG. 6. Ventilation fan 36 draws in moist air from container 13 which contains content requiring moisture and temperature regulation, and carries the moist air through evaporator 35. The moist air is cooled below its dew point. The moisture from the moist air condenses on the cold surface of the evaporator and drips into water drain pipe 312. Then the cold dry air continues and returns it to the inner space 56 of container 13 to pick up new humidity. Airflow path 116 within the condenser-side section is also shown in FIG. 6. Air flow path 116 shows that there is convection of the air in the condenser-side with external or outside open air.

When humidity sensor 39 detects that the humidity of inside air circulation space is 20% or less, or inside environment temperature sensor 38 detects that the temperature of inside air circulation space is 2° C. or less, or when running time is exceeding preset T1, compressor 313, condenser fan 32, and ventilation fan 36 are turned off.

When outside environment temperature sensor 31 detects that external environment temperature is below 6° C., compressor 313, condenser fan 32, and ventilation fan 36 are turned off. When outside environment temperature sensor 31 detects that external environment temperature is below −2° C. and when the processor installed on moisture and temperature regulating unit 12 determines that it is preset garbage pickup date, heater 311 and ventilation fan 36 are turned on at preset time (for example, 6 am) to thaw the content of the container.

When inside environment temperature sensor 38 detects that the temperature of inside air circulation space is 4° C. or more, or when running time is exceeding preset T2, heater 311 and ventilation fan 36 are turned off.

The invention claimed is:

1. A modular assembly for regulating moisture and temperature of content of a container comprising:
- a moisture and temperature regulating device comprising:
  - a housing equipped with an outside environment temperature sensor and wherein a cover plate of the housing has an air inlet and an air outlet;
  - wherein a first position sensor is positioned in a vicinity of the air inlet and a second position sensor is positioned in a vicinity of the air outlet;
  - a condenser section equipped with a condenser, a condenser fan, and a compressor;
  - an evaporator section equipped with a ventilation fan, an evaporator, an inside environment temperature sensor, an inside humidity sensor, a heater, and water drainage pipe; wherein the air inlet is aligned with at least a portion of the ventilation fan and the evaporator, and wherein the air outlet is aligned with at least a portion of the heater;
  - wherein the condenser section and the evaporator section are separated by a heat insulation layer;
- a portable container separate and joinable to the moisture and temperature regulating device, the container having a coupling plate with an upper ventilation outlet and a lower ventilation inlet contained therein;
- the air inlet of the moisture and temperature regulating device is joinable with the upper ventilation outlet of the container by abutting and joining the cover plate of the housing of the moisture and temperature regulating device and the coupling plate of the container;
- the air outlet of the moisture and temperature regulating device is joinable with the lower ventilation inlet of the container by abutting and joining the cover plate of the housing of the moisture and temperature regulating device and the coupling plate of the container;
- when the moisture and temperature regulating device and the container are joined by abutting and joining the cover plate of the housing of the moisture and temperature regulating device and the coupling plate of the container, the first position sensor and the second position sensor of the moisture and temperature regulating device detect that the container is in normal operating position, wherein the container and the moisture and temperature regulating device form a closed air circulation system and the moisture and temperature associated with the content of the container are regulated by the moisture and temperature regulating device within the closed air circulation system.

2. The modular assembly according to claim 1, where the container is a household garbage container.

3. The modular assembly according to claim 2, where the container is equipped with wheels.

4. The modular assembly according to claim 2, where the container is equipped with a rotatable cover, wherein the coupling plate is vertical to the rotatable cover when the rotatable cover is in a closed position.

5. The modular assembly according to claim 2, where the container is constructed with thermal insulating material.

6. The modular assembly according to claim 1, where the compressor operates when the outside environment temperature sensor detects that external environment temperature is above 6° C., and the heater operates when the outside environment temperature sensor detects that external environment temperature is below −2° C.

7. The modular assembly according to claim 1, wherein the air inlet, the air outlet, or both the air inlet and the air outlet, are equipped with a sealing cushion, to provide air tightness of the modular assembly from the external environment.

* * * * *